(12) United States Patent
Kornfeld et al.

(10) Patent No.: US 7,084,572 B2
(45) Date of Patent: Aug. 1, 2006

(54) PLASMA-ACCELERATOR CONFIGURATION

(75) Inventors: Günter Kornfeld, Elchingen (DE); Werner Schwertfeger, Blaubeuren (DE); Roland Lenz, Ulm (DE); Gregory Coustou, Ulm (DE)

(73) Assignee: Thales Electron Devices GmbH, Ulm (DE)

( * ) Notice: Subject to any disclaimer, the term of this patent is extended or adjusted under 35 U.S.C. 154(b) by 0 days.

(21) Appl. No.: 10/481,778

(22) PCT Filed: Jun. 24, 2002

(86) PCT No.: PCT/EP02/06950

§ 371 (c)(1),
(2), (4) Date: May 17, 2004

(87) PCT Pub. No.: WO03/000550

PCT Pub. Date: Jan. 3, 2003

(65) Prior Publication Data

US 2004/0183452 A1 Sep. 23, 2004

(30) Foreign Application Priority Data

Jun. 23, 2001 (DE) ................. 101 30 464

(51) Int. Cl.
*H01J 7/24* (2006.01)
*H05B 31/26* (2006.01)
(52) U.S. Cl. ............... 315/111.21; 315/111.41; 315/111.61; 315/501; 313/359.1
(58) Field of Classification Search ......... 315/501, 315/111.21, 111.31, 111.41, 111.61, 111.71, 315/111.81; 313/231.31, 162, 359.1, 360.1, 313/361.1, 363.1; 60/202
See application file for complete search history.

(56) References Cited

U.S. PATENT DOCUMENTS

| | | | |
|---|---|---|---|
| 3,309,873 A * | 3/1967 | Cann | 60/203.1 |
| 3,462,622 A | 8/1969 | Cann et al. | 310/11 |
| 3,735,591 A | 5/1973 | Burkhart | 60/202 |
| 3,831,052 A * | 8/1974 | Knechtli | 313/595 |
| 3,916,239 A * | 10/1975 | Friedlander | 313/460 |
| 3,956,666 A | 5/1976 | Reader et al. | 315/111.8 |
| 4,296,327 A | 10/1981 | Adamski | 250/423 R |
| 4,821,508 A | 4/1989 | Burton et al. | 60/203.1 |
| 4,821,509 A | 4/1989 | Burton et al. | 60/203.1 |

(Continued)

FOREIGN PATENT DOCUMENTS

DE 1222589 8/1966

(Continued)

OTHER PUBLICATIONS

Aidar Zhakupov "Hall thruster with a sectioned conducting channel." Proc. 3$^{rd}$ International Conference on Spacecraft Propulsion 10.13. Oct. 2000, pp. 827-828. XP 002902652 Cannes 2000.

(Continued)

*Primary Examiner*—Don Wong
*Assistant Examiner*—Marie Antoinette Cabucos
(74) *Attorney, Agent, or Firm*—Collard & Roe, P.C.

(57) ABSTRACT

The invention relates to various advantageous embodiments of a plasma-accelerator configuration, especially for the configuration and design of electron sources used for ionizing the working gas and/or neutralizing the discharged plasma jet.

11 Claims, 2 Drawing Sheets

U.S. PATENT DOCUMENTS

Figure 1:
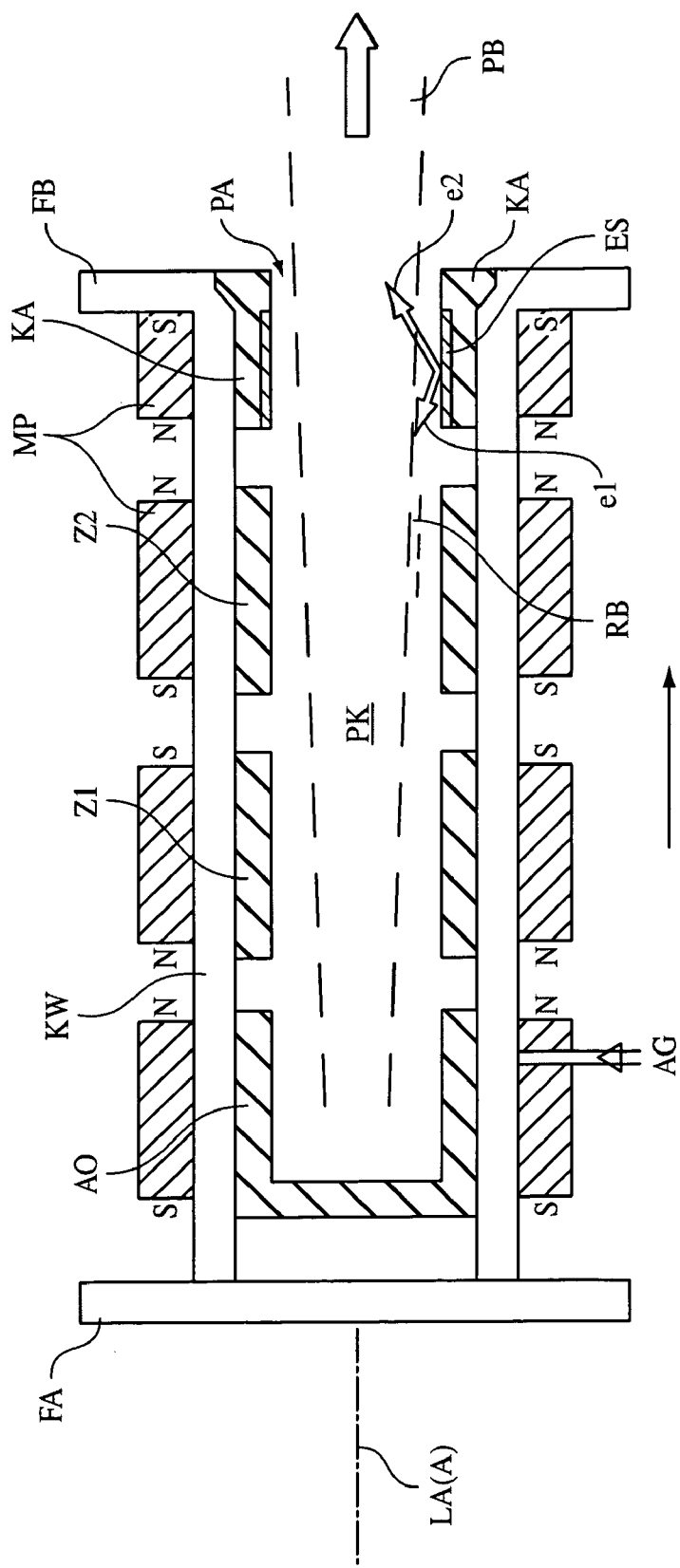

| | | | | |
|---|---|---|---|---|
| 5,274,306 | A | * | 12/1993 | Kaufman et al. ....... 315/111.41 |
| 5,387,843 | A | * | 2/1995 | Nagayama et al. ...... 315/111.81 |
| 5,497,006 | A | * | 3/1996 | Sferlazzo et al. ........... 250/427 |
| 5,539,274 | A | * | 7/1996 | Araki et al. ............. 313/362.1 |
| 5,576,538 | A | * | 11/1996 | Sakai et al. ................. 250/251 |
| 5,601,653 | A | * | 2/1997 | Ito ....................... 118/723 FE |
| 5,703,375 | A | * | 12/1997 | Chen et al. ............ 250/492.21 |
| 5,760,405 | A | * | 6/1998 | King et al. ............. 250/423 R |
| 5,838,120 | A | * | 11/1998 | Semenkin et al. .......... 315/505 |
| 5,847,493 | A | | 12/1998 | Yashnov et al. ....... 315/231.31 |
| 5,892,329 | A | * | 4/1999 | Arkhipov et al. ....... 315/111.91 |
| 5,947,421 | A | * | 9/1999 | Beattie et al. ............ 244/171.1 |
| 6,075,321 | A | | 6/2000 | Hruby .................... 315/111.91 |
| 6,195,980 | B1 | * | 3/2001 | Walther ........................ 60/202 |
| 6,448,721 | B1 | * | 9/2002 | Raitses et al. .............. 315/501 |
| 6,523,338 | B1 | | 2/2003 | Kornfeld et al. .............. 60/202 |
| 6,777,862 | B1 | * | 8/2004 | Fisch et al. .............. 313/359.1 |
| 6,803,705 | B1 | | 10/2004 | Kornfeld et al. ....... 313/231.31 |

FOREIGN PATENT DOCUMENTS

| | | |
|---|---|---|
| DE | 198 28 704 A1 | 12/1999 |
| EP | 0 541 309 A1 | 5/1993 |
| EP | 0541309 | 5/1993 |
| JP | 06249131 A | 9/1994 |
| JP | 08045697 A | 2/1996 |
| SU | 1796777 A1 | 2/1993 |
| WO | WO 01/71185 | 9/2001 |

OTHER PUBLICATIONS

"Hall Thruster with a Sectioned Conducting Channel" pp. 827, 828 by Aidar Zhakupov, Sergey Khartov, and Leonid Latyshev; 3rd Internat. Spacecraft Propulsion Cannes Oct. 10-13, 2000.

International Search Report.

* cited by examiner

PLASMA-ACCELERATOR CONFIGURATION

CROSS REFERENCE TO RELATED APPLICATIONS

Applicants claim priority under 35 U.S.C. §119 of German Application No. 101 30 464.1 filed on Jun. 23, 2001. Applicants also claim priority under 35 U.S.C. §365 of PCT/EP02/06950 filed on Jun. 24, 2002. The international application under PCT article 21(2) was not published in English.

The invention relates to a plasma accelerator configuration.

Plasma accelerator configurations are known, in particular, in the form of Hall thrusters, which possess a plasma chamber that runs about a central axis. At the bottom of the plasma chamber, a ring-shaped anode is arranged, from which the plasma chamber extends essentially in the shape of a circular ring cylinder, in the longitudinal axis direction, towards the plasma beam exit. On the side of the plasma beam exit from the plasma chamber, and typically outside of the latter, an active cathode, particularly in the form of a hollow plasma cathode with gas discharge, or a thermionic cathode, is arranged as the electron source, which emits electrons into the plasma chamber on the one hand, and in the direction of the exiting plasma beam, for its neutralization, on the other hand. The electrons guided into the plasma chamber are accelerated in the direction of the anode, by means of an electrical field, and are forced into ring-shaped drift paths by means of a magnetic field. The magnetic field fills the plasma chamber essentially in the radial direction, and is generated by means of a first pole configuration about the central axis, which is surrounded by the plasma chamber, and a second pole configuration, which surrounds the plasma chamber on the outside, as a magnetic counter-pole. Such a Hall accelerator configuration is known, for example, from EP 0 541 309 A1.

A Hall accelerator configuration described in U.S. Pat. No. 5,847,493 shows a more complex magnetic field, in which a second pair of poles is spaced apart from a first pair of poles, in the longitudinal direction, with the opposite orientation. Both pairs of poles possess an inner first pole, surrounded by the plasma chamber, and an outer second pole, which surrounds the plasma chamber, in each instance.

DE 198 28 704 A1 shows a plasma accelerator configuration having an essentially circular-cylindrical plasma chamber, which contains the longitudinal axis as the center axis. An externally generated bundled electron beam is guided on the center axis by means of a magnet configuration that surrounds the plasma chamber, with alternating consecutive pole changes in the longitudinal direction, and serves not only for the effect of initiating ionization of the working gas, but also, in particular, neutralizing the plasma beam that exits from the plasma chamber in the same direction.

A plasma accelerator configuration from DE-AS 1222589 also guides a bundled electron beam through a plasma chamber extended in the lengthwise direction, and thereby neutralizes a plasma beam that exits from the plasma chamber in the same direction. Part of the electrodes in the plasma chamber can consist of tungsten.

In the case of a particle accelerator described in U.S. Pat. No. 4,296,327, a high-energy pulsed electron beam is emitted from a cathode and passed through an anode diaphragm, the diaphragm edges of which are provided with a plastic material. High-energy electrons that impact the plastic material strike protons out of the plastic material, which are attracted by the electron beam that passed through the diaphragm opening, due to spatial charge effects, and are accelerated in the beam direction.

In U.S. Pat. No. 3,735,591, a magneto-plasma-dynamic (MPD) thruster is described, in which a cathode is arranged outside of a plasma chamber, the wall of which is formed by a circular-cylindrical anode electrode, spaced apart from the plasma chamber on an extension of the center axis of the plasma chamber, in the direction of the plasma beam, and thereby in the center of the plasma beam. The cathode is supplied with a gas in order to start the thruster. In ongoing operation, the cathode is heated to almost 2000 K by means of the ion bombardment, and emits thermal electrons in the direction of the anode.

The present invention is based on the task of indicating another plasma accelerator configuration, which is particularly characterized by a simple structure.

Solutions according to the invention are indicated in the independent claims. The dependent claims contain advantageous embodiments and further developments of the invention.

A first variant of the invention provides for a plasma accelerator configuration in which a passive electrode surface is provided within the plasma chamber, preferably in the region of the plasma beam exit, as the source of electrons for ionizing the working gas, which surface is impacted by part of the ions of the plasma beam, particularly from the edge region of the beam, and releases electrons when ions hit. A passive electrode that emits electrons, or a passive cathode, is to be understood, here and in the following, in contrast to the active cathode indicated initially, as an electrode that is neither heated nor operated with gas discharge. The electrons released in such a manner are at least partially accelerated counter to the running direction of the plasma beam, in the direction of the anode, by means of the electrical field between the acceleration electrode and are influenced by the magnetic field that fills the plasma chamber, in known manner, particularly they are forced onto drift paths crosswise to the longitudinal direction of the plasma chamber, to increase the dwell time and the ionization effect. Thrust ionization of the working gas releases additional electrons at the same time.

By means of using a passive electrode surface as the electron source for the ionizing electrons, the plasma accelerator configuration can be significantly simplified. Preferably, an active electron source can be completely eliminated, whereby then the passive electron source also emits the electrons for neutralizing the plasma beam, under the bombardment with ions of the plasma beam, which electrons are attracted in the direction of the plasma beam by the spatial charge of the ions, and are entrained. The electron source for this is preferably formed by a partial surface of the acceleration electrode.

For efficient generation of free electrons during bombardment of the electron source with ions of the plasma beam, the electron source preferably contains a material, preferably a metal, having a low inherent sputterability, for a long lifetime even under ion bombardment and/or at a high electron release factor, which is a measure for the extent of an electron shower released upon impact of an ion.

The configuration of the electron source in the region of the plasma beam exit of the plasma chamber results in a high energy of the ions of the accelerated plasma beam that impact the electron source, and therefore in the generation of a sufficient number of electrons. If the electron source is advantageously arranged only in an edge region of the plasma beam, particularly near the chamber wall of the plasma chamber, ions from a more strongly diverging part of the plasma beam, which make a reduced contribution to the thrust-back impulse of the plasma beam, in any case, because of the divergence, impact the electron source, in particular.

The electron source for the generation of electrons for ionizing the working gas can also be arranged between the acceleration electrode, at a distance from it, and the anode, and can then be impacted with ions having a lower kinetic energy than at the exit from the plasma chamber. This can be particularly advantageous if an electrical electrode configuration that is multi-stage in the longitudinal direction, having one or more intermediate electrodes between the acceleration electrode and the anode is provided. In the generation of the electrodes for ionizing the working gas in an intermediate electrode stage, it is advantageous if a separate electron source for neutralizing the plasma beam is provided in the region of the exit of the plasma beam from the plasma chamber.

The start of ionization in the plasma chamber can take place by means of spontaneously formed electron/ion pairs, for example those formed by the effect of energy-rich cosmic radiation, which drift apart when an electrical field is applied between the acceleration electrode and the anode, and result in the release of electrons by means of ion impact on the passive electron source, and set the generation of the plasma into motion. An initial ionization can also be triggered and/or supported by means of a short-term increase in an electrical field and/or in the pressure of the working gas in the plasma chamber, over and above the values of ongoing operation.

The generation of electrons for ionizing the working gas and/or neutralizing the exiting plasma beam by means of a passive electron source, not heated and impacted with ions of the plasma beam, can advantageously be utilized for most of the known geometries of the plasma chamber, particularly the ring shape of the Hall thruster and the circular cylinder shape having a central longitudinal axis contained in the plasma chamber. The use of the passive electron source is particularly advantageous in connection with a structure of a plasma chamber having several consecutive stages in the longitudinal direction of the plasma chamber, which each have their own electrode at an intermediate potential between the acceleration electrode and the anode, and have a particularly high multiplication rate of the electrons because of strong radial magnetic field components between the consecutive electrodes. Because of the generation of the electrons in the plasma chamber, the electrons have a low velocity, and this is advantageous for the thrust ionization of the working gas.

A second variant of the invention provides for using the configuration of an electron source arranged outside the plasma chamber, particularly an active electron source, which is known from the Hall thruster, for constructing a plasma chamber in which the plasma chamber has an essentially rotation-symmetrical shape and, in contrast to the Hall thruster, does not keep a central region about the center longitudinal axis clear in ring shape, but rather contains the center longitudinal axis. In this connection, the magnetic field configuration has at least one first magnetic pole that surrounds the plasma chamber, between the acceleration cathode and the anode, and at least another second magnetic pole that is at a distance from the first magnetic pole, in the longitudinal direction, as the counter-pole. In comparison with this, the corresponding magnetic poles that decisively define the magnetic field in the plasma chamber lie essentially radially opposite one another in the Hall thruster.

The external electron source can, in usual manner, provide not only the electrons passed into the plasma chamber for ionizing the working gas, but also the electrons needed for neutralizing the exiting plasma beam. It is advantageous to use the wealth of experience gained with such external electron sources in Hall thrusters as a basis.

In contrast to known plasma accelerator configurations, with a structure of the plasma chamber that has magnetic field configurations that contain the longitudinal axis, and comparable ones, in which an electron beam is introduced on the longitudinal axis, no beam system for generating a bundled electron beam is required, which simplifies the structure of the configuration and shortens the construction length. In particular, the plasma chamber can be closed off to the rear, on the anode side.

It is advantageous if the magnetic field arrangement is structured in multiple stages, with alternating consecutive pole changes in the longitudinal direction, and preferably combined with a multi-stage configuration of electrodes at different potentials, in the longitudinal direction, with at least one intermediate electrode in the longitudinal progression of the plasma chamber at an intermediate potential between the acceleration electrode and the anode. The intermediate electrodes preferably lie between consecutive magnetic poles in the opposite direction, in the longitudinal direction.

Figure 2:
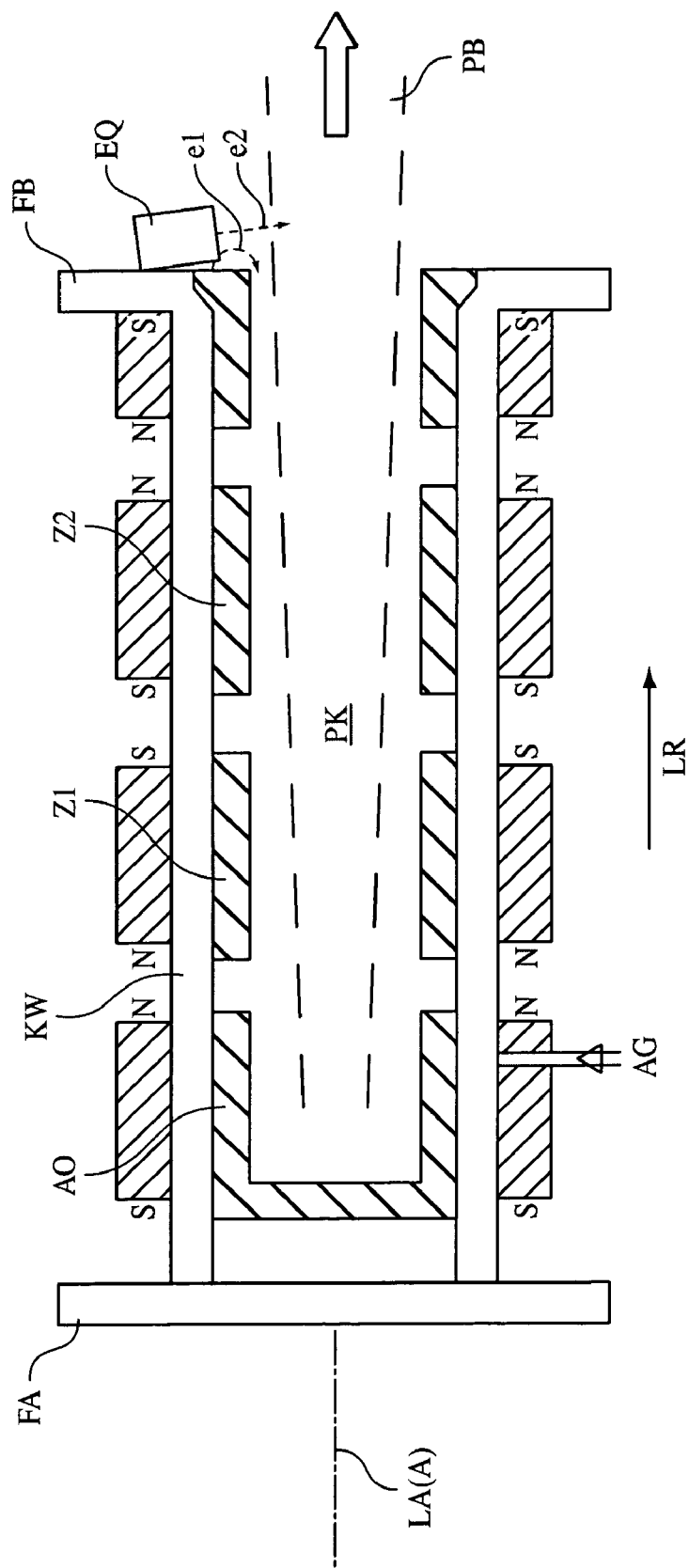

The invention will be thoroughly illustrated in the following, on the basis of preferred exemplary embodiments, making reference to the figures. These show:

FIG. 1 a longitudinal cross-section through a plasma chamber having a passive electron source, FIG. 2 a longitudinal cross-section through a plasma chamber having an external electron source.

The structure of a plasma chamber shown in FIG. 1, in longitudinal cross-section, is drawn in greatly simplified form. The plasma chamber PK is laterally delimited by non-conductive chamber walls KW. The plasma chamber can possess a known shape, for example it can be structured with rotation symmetry about a first center longitudinal axis LA (A), which runs through the plasma chamber, essentially circular-cylindrical or, like a Hall thruster, ring-shaped about a second center longitudinal axis LA (B), which then does not run through the plasma chamber. In the latter case, a second longitudinal cross-section with mirror symmetry to the longitudinal axis LA (B) must be added. In the following, the structure mentioned first, having a central longitudinal axis LA (A), will be used for a further explanation of FIG. 1.

The plasma chamber can be provided with a flange FA on the anode side, and a flange FB on the exit side, for an attachment within a larger configuration. The chamber wall KW can consist of a ceramic, for example.

In the plasma chamber, which extends between an anode electrode AO and a cathode KA that is located at the exit PA of the plasma beam PB, as the acceleration electrode for the positively charged ions of a working gas, for example xenon, additional intermediate electrodes Z1 to Zn can be provided consecutively in the longitudinal direction LR; in the example sketched here, they are Z1 and Z2. The intermediate electrodes Z1, Z2 lie at different electrical potentials between the potentials of anode AO and cathode KA. The lines to the individual electrodes are not shown on the drawing.

Outside the plasma chamber PK and the chamber wall KW that surrounds it, a magnetic field configuration is provided, which surrounds the plasma chamber PK, preferably in ring shape.

The poling of the consecutive stages of the magnet configuration, in the longitudinal direction, alternates from stage to stage. The magnetic poles MP of the individual stages preferably lie in the gaps between the consecutive stages in the longitudinal direction. Because of the alternating poling of the consecutive stages of the magnet configuration, a particularly advantageous magnetic field progression forms in the plasma chamber, with strong radial components at the gaps between consecutive electrodes.

The plasma beam forms in bundled manner, without sharp borders, about the longitudinal axis (or, in the case of a ring-shaped plasma chamber, about the center of the plasma chamber), and typically demonstrates a slight divergence towards the exit PA, in the longitudinal direction. The electrical field in the plasma chamber accelerates the ions of the working gas AG in the direction of the plasma beam exit PA. In this connection, ions also occur that are so far removed from the central longitudinal axis, in the edge region RB of the plasma beam, that they impact laterally on electrode surfaces, particularly in the region of the beam exit PA, onto the cathode KA. Because of the high kinetic energy of the ions, electrons can be hit out of the surface of the passive cathode when this happens. These electrons, which are released from the passive cathode, can be accelerated in the direction of the anode by the differences in the applied potentials, and can move in the plasma chamber under the influence of the electrical and magnetic fields that prevail in the plasma chamber, and thereby can generate both positively charged ions and other electrons, because of the thrust ionization of the working gas AG, which is introduced in the region of the anode, as a neutral gas. This portion of electrons, which is released from the cathode by means of ion impact, is indicated as e1 in FIG. 1.

For another thing, the electrons released from the cathode can move towards the plasma beam, as a portion e2, under the influence of the positive spatial charge of a plasma beam that has not yet been neutralized, and contribute to neutralizing it.

The cathode KA can have a material having a low inherent sputterability, in its entirety or at least on one of the partial regions facing the impacting ions, from which no atoms inherent to the material are released under ion bombardment, and can also have a specially prepared partial surface or an insert ES for this purpose.

The impact of ions, with the release of electrons, can also occur at a different location, particularly also at the intermediate electrodes Z1, Z2, whereby the energy loss from the plasma beam is lower, because at this location, the kinetic energy of the impacting ion is lower, on the average. An impact of an ion onto the cathode, as the last electrode in the longitudinal progression of the plasma chamber can, however, drive out more electrons because of the higher energy of the ions there, and these also demonstrate a significantly higher multiplication factor on their longer path through the plasma chamber, particularly in the case of a multi-stage structure of the electrode and magnet configuration.

Instead of or in addition to the acceleration electrode KA itself, a separate electrode for releasing electrons by means of ion impact can also be provided. Furthermore, if the neutralization effect of free electrons generated by means of ion impact is insufficient, an additional heated electron source can be provided at the exit from the plasma chamber, as a neutralizer. However, an embodiment entirely without any active electron source, and with the generation of free electrons for ionization and neutralization from the passive electrode alone, by means of impact of ions from the plasma beam itself, is preferred because of the particularly simple structure.

The start of ionization of the working gas can take place, under some circumstances, in the case of introduction of working gas into the plasma chamber, by means of spontaneous charge carrier separation or the effect of high-energy cosmic radiation with subsequent multiplication of separate charge carriers in the plasma chamber. However, to support and/or ensure the start of ionization initially, a gas discharge can also be ignited at introduction of the working gas, by means of a short-term higher pressure of the working gas and/or a higher voltage between two electrodes.

In the variant shown in FIG. 2, a structure with a plasma chamber that encloses the central longitudinal axis is presumed for the plasma chamber, as it is known, in similar manner, from DE 198 28 704 A1, which was mentioned in the introduction. In the case of the embodiment shown in FIG. 2, however, the electrons e1 are generated for ionizing the working gas, and the electrons e2 are generated for neutralizing the exiting plasma beam, in an external electron source EQ which, as in the case of conventional Hall thruster configurations, is arranged in the region of the plasma beam exit and, in particular, can be heated and/or operated with a gas discharge.

However, while the plasma chamber is structured in ring shape in the case of Hall thruster configurations, and a magnet configuration having a first inner magnetic pole that is surrounded by the plasma chamber, and a second outer magnetic pole that surrounds the plasma chamber are provided, in the case of the configuration shown in FIG. 2, the combination of the external electron source with the shape of the plasma chamber that encloses the central center longitudinal axis, and with a magnet configuration which, as already described in connection with FIG. 1, has alternating magnetic poles in the longitudinal direction, which are spaced apart from one another in the longitudinal direction and surround the plasma chamber in ring shape, is essential. Such a combination of characteristics results in particularly advantageous ring flow conditions and good efficiency of the configuration. A multi-stage configuration having more than two pole locations of the magnet configuration in the longitudinal direction and having intermediate electrodes that lie electrically at intermediate potentials between the external cathode EQ and the anode AO is particularly advantageous. Furthermore, positioning of the magnetic poles in the plasma chamber, in the longitudinal direction, at the gaps between consecutive electrodes in the longitudinal direction, is advantageous.

The characteristics indicated above and in the claims, as well as those evident in the figures, can be advantageously implemented both individually and in various combinations. The invention is not limited to the exemplary embodiments described, but rather can be modified in many different ways, within the scope of knowledge in the art.

The invention claimed is:

1. Plasma accelerator configuration for emission of an accelerated plasma beam in a longitudinal direction, having a plasma chamber delimited laterally by a chamber wall, between an anode and an acceleration electrode arranged at the plasma beam exit from the plasma chamber, and an electron source formed by a partial surface of the acceleration electrode, which source provides electrons to the plasma chamber from the side of the plasma beam exit, which electrons are exposed to an electrical and a magnetic field in the plasma chamber, for ionizing the working gas in the plasma chamber, whereby the electron source is formed by a passive electron surface within the plasma chamber, which surface is impacted by part of the plasma beam and releases electrons when the ions impact.

2. Configuration according to claim 1, wherein the passive electrode surface is laterally spaced apart from a center longitudinal axis of the plasma chamber.

3. Configuration according to claim 1, wherein the passive electrode surface is arranged on the chamber wall.

4. Configuration according to claim 1, wherein the passive electrode surface is structured as a ring surface or as individual surfaces arranged about the center longitudinal axis in ring shape.

5. Configuration according to claim 1, wherein the electron source is metallic.

6. Configuration according to claim 1, wherein the electron source additionally delivers electrons for neutralizing the exiting plasma beam.

7. Plasma accelerator configuration for emission of a directed accelerated plasma beam, having a plasma chamber between an anode and an acceleration electrode arranged at the plasma beam exit from the plasma chamber, as well as a magnetic field configuration and an electron source, which source provides electrons to the plasma chamber from the side of the plasma beam exit, which electrons are exposed to an electrical and a magnetic field in the plasma chamber, for ionizing the working gas in the plasma chamber, wherein the plasma chamber is structured with rotation symmetry about and contains a longitudinal axis, and wherein the magnetic field configuration in the longitudinal direction has at least one first magnetic pole that surrounds the plasma chamber, the counter-pole of which is spaced apart from the first magnetic pole in the longitudinal direction, and the electron source comprises an electrode arranged on the side of the plasma beam exit, arranged outside the plasma chamber, and wherein the magnetic field configuration has more than two alternating consecutive roles in the longitudinal direction.

8. Configuration according to claim 7, wherein one or more additional electrodes are provided between the anode and the acceleration electrode, which lie at intermediate potentials between the potentials of the acceleration electrode and the anode.

9. Configuration according to claim 7, wherein the external electron source additionally delivers a neutralizing stream for a non-neutral plasma beam that exits from the plasma chamber.

10. Configuration according to claim 7, wherein the plasma chamber is closed on the anode side and that no electron beam is passed into the plasma chamber from the anode side that lies opposite the plasma beam exit in the longitudinal direction.

11. Plasma accelerator configuration for emission of an accelerated plasma beam in a longitudinal direction, having a plasma chamber delimited laterally by a chamber wall, between an anode and an acceleration electrode arranged at the plasma beam exit from the plasma chamber, and an electron source, which source provides electrons to the plasma chamber from the side of the plasma beam exit, which electrons are exposed to an electrical and a magnetic field in the plasma chamber, for ionizing the working gas in the plasma chamber, whereby the electron source is formed by a passive electron surface within the plasma chamber, which surface is impacted by part of the plasma beam and releases electrons when the ions impact, wherein one or more intermediate electrodes are arranged in the longitudinal direction, between the anode and the acceleration electrode, which lie at electrical intermediate potentials, and a multistage magnet configuration in the longitudinal direction generates a magnetic field having a concentration of radial magnetic field components between consecutive electrodes.

* * * * *